United States Patent

[11] 3,620,548

[72] Inventors Friedrich H. Van Winsen
Kirchheim Teck;
Kurt Trachte, Echterdingen; Günther
Haverbeck, Plochingen, all of Germany
[21] Appl. No. 811,455
[22] Filed Mar. 28, 1969
[45] Patented Nov. 16, 1971
[32] Priority Mar. 30, 1968
[33] Germany
[31] P 17 55 113.2

[54] SUSPENSION OF STEERABLE FRONT WHEELS OF MOTOR VEHICLES
15 Claims, 4 Drawing Figs.

[52] U.S. Cl. .................................... 280/96.2,
267/20 A
[51] Int. Cl. ..................................... B62d 7/16
[50] Field of Search .......................... 280/96.2,
124.1; 267/20 A; 188/18 A

[56] References Cited
UNITED STATES PATENTS

| 2,556,767 | 6/1951 | McCann | 267/20 X |
| 2,567,144 | 9/1951 | Butterfield | 280/96.2 |
| 2,621,919 | 12/1952 | Utz | 267/20 |
| 2,779,603 | 1/1957 | McRae | 267/20 X |
| 2,968,492 | 1/1961 | Nallinger | 267/20 X |
| 3,139,275 | 6/1964 | Burkitt | 280/96.2 X |
| 3,446,513 | 5/1969 | Weiertz | 280/96.2 |
| 3,492,018 | 1/1970 | Burckhardt et al. | 280/96.2 |

FOREIGN PATENTS

| 1,105,967 | 3/1968 | Great Britain | 280/96.2 |
| 595,880 | 7/1959 | Italy | |
| 1,077,538 | 3/1960 | Germany | |

Primary Examiner—Leo Friaglia
Assistant Examiner—Leslie J. Paperner
Attorney—Craig, Antonelli and Hill ABSTRACT: A suspension for the steerable front wheels of motor vehicles by means of superposed guide members in which the joint connecting the lower guide member with the wheel carrier is arranged either partially or completely on the inside of an approximately trough-shaped recess of the brake disk or the like approximately at the height of the wheel center.

INVENTORS
FRIEDRICH H. VAN WINSEN
KURT TRACHTE
GÜNTHER HAVERBECK

ATTORNEYS

INVENTORS
FRIEDRICH H. VAN WINSEN
KURT TRACHTE
GÜNTHER HAVERBECK

BY Craig, Antonelli, Stewart & Hill

ATTORNEYS

SUSPENSION OF STEERABLE FRONT WHEELS OF MOTOR VEHICLES

The present invention relates to a suspension of steerable front wheels of motor vehicles by means of guide members arranged one above the other and pivotally guiding the wheel carrier.

With the customary wheel suspensions by means of superposed guide members, the wheel center axis as a rule lies between the two guide members. The joint connecting the lower guide member with the wheel carrier is thereby located laterally adjacent the brake disk and therefore has a relatively large spacing from the center longitudinal plane of the wheel. The steering knuckle pivot axis or steering axis of the wheel which is determined by the two joints connecting the wheel carrier with the guide members, thereby extends along the inside of the wheel at a certain distance from the point of contact of the wheel with the road surface, which corresponds to a positive roll radius. This customary prior art arrangement, however entails disadvantages both with respect to structural nature as also as to the properties affecting the roadability.

The present invention aims above all at achieving with advantageous spatial arrangements of the wheel guide members, an increased safety in the running and in the steering of the front wheels as well as with a smooth steering, a safe absorption of the forces acting at the front wheels.

Accordingly, the present invention essentially consists in that the joint connecting the lower guide member with the wheel carrier is arranged inside of an approximately trough- or dish-shaped recess or indentation of the brake disk approximately at the height of the wheel center. Since by reason of the coaxial arrangement of the joint with respect to the wheel, the joint can be displaced relatively far into the inside of the wheel, already with a slight inclination of the steering knuckle pivot corresponding to the inclination of the steering axis, a negative roll radius can be achieved, i.e., a point of intersection of the steering axis or steering knuckle pivot axis with the road surface outside of the point of contact of the wheel with the road, which improves the straight drive with strong differences of the coefficient of friction between the front wheel brakes, and therewith increases the safety and also reduces the steering forces.

This advantage can be achieved above all if the joint connecting the steering member with the upper guide member is located above the wheel and the wheel carrier is correspondingly cranked about the wheel contour. The upper joint therefore lies outside the pivot range of the steerable wheel, and the angle of the steering axis can receive a small favorable value also with negative roll radius whereas simultaneously the lower joint can be moved close to the longitudinal center plane of the vehicle extending through the point of contact of the wheel with the road surface.

The relatively high location of the guide member and of the joint connecting the same with the wheel carrier further permits in a particularly appropriate manner a longitudinal yieldingness of the wheel. In connection therewith, as is known, the joint connecting the wheel carrier with the upper guide member can be supported at the vehicle superstructure relatively inelastically in the longitudinal direction and the joint connecting the wheel carrier with the lower guide member can be supported at the vehicle superstructure relatively elastically in the vehicle longitudinal direction by means of the respectively associated guide member. The impacts hitting the wheel are thereby absorbed by the lower guide member with the full lever arm corresponding to the distance of the two joints and are transmitted to the vehicle superstructure with a damping corresponding to the yieldingness. Also, the loads of the joints which connect the wheel carrier with the two guide members, caused by lateral guide and brake forces are smaller as a result of the relatively large support basis corresponding to the distance of the joints. Simultaneously therewith, by reason of the relatively high, lower guide member, a large road clearance is achievable. Additionally, the use of an oil-air spring leg is structurally possible with particular advantage for the spring support of the front wheel.

In conjunction with the relatively high, upper guide member and the relatively inelastic support thereof at the vehicle superstructure, it can further be achieved, if the steering linkage is connected to the wheel carrier within the area of the upper, essentially inelastically supported joint, that notwithstanding the large yeildingness of the wheel, the steering is not or is practically not influenced by this yieldingness. Steering defects and changes in toe-in can be reduced thereby with simultaneous good longitudinal elasticity of the wheel guidance at the lower guide member. Also, a constructive, particularly favorable location of the steering as regards the engine installation results, especially if the upper guide member is supported at the vehicle superstructure further backwards in proximity to the engine clutch.

Accordingly, it is an object of the present invention to provide a suspension for the steerable front wheels in motor vehicles which avoids by simple means the aforementioned shortcomings and drawbacks encountered in the prior art.

Another object of the present invention resides in a wheel suspension for the steerable front wheels of motor vehicles which offers improved roadability combined with simplicity in construction.

A further object of the present invention resides in a suspension for the steerable front wheels of motor vehicles which entails an increased safety in the running of the wheels and in the steering of the front wheels as well as a safe absorption of the forces acting against the front wheels.

Still another object of the present invention resides in a suspension for the steerable front wheels of the type described above in which the angle of the steering axis can receive a relatively small favorable value also with negative roll radius while the stresses in the joints can be kept within relatively low permissive limits.

These and other objects, features, and advantages of the present invention will become more obvious from the following description when taken in connection with the accompanying drawing which shows, for purposes of illustration only, one embodiment in accordance with the present invention, and wherein.

Figure 1:
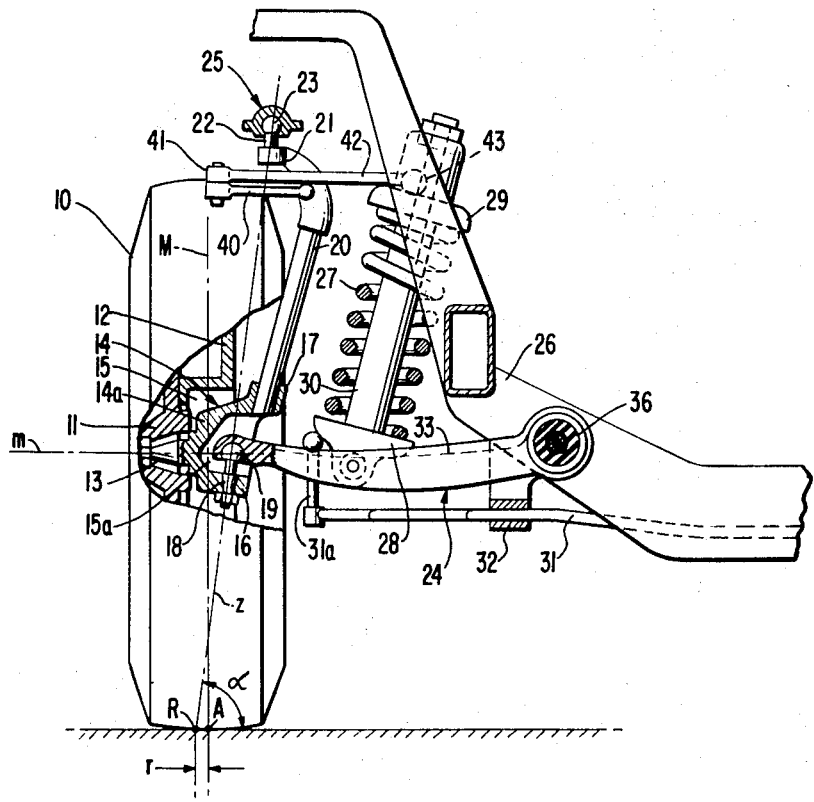
FIG. 1 is an end elevational view of a front wheel suspension in accordance with the present invention, partly in cross section.
Figure 2:
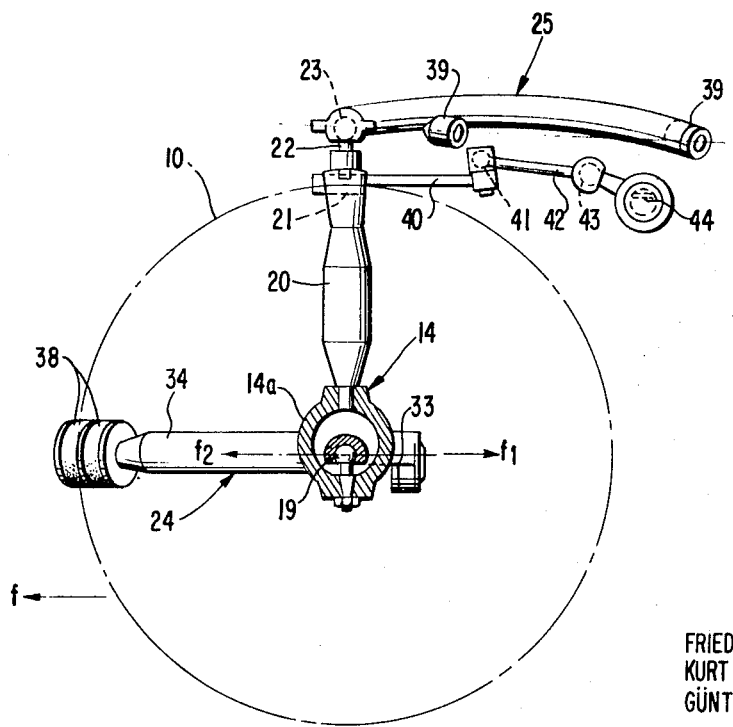
FIG. 2 is a side elevational view of the front wheel suspension of FIG. 1.

Referring now to the drawing wherein like reference numerals are used throughout the various views to designate like parts, the front wheel 10 is secured in a conventional manner by means of its wheels hub 11, at which is also secured the brake disk 12, on a wheel pin or journal 13 which forms a part of the wheel carrier generally designated by reference numeral 14. The wheel carrier 14 is provided at the height of the wheel center axis $m$ with a shell-shaped or cup-shaped part 14a which is accommodated in a trough- or dish-shaped recess 15 of the brake disk 12 and is delimited below and above by the extensions 16 and 17. A joint bolt 18 with ball pin 19 is detachably inserted into the lower extension 16 which connects the wheel carrier 14 with the lower guide assembly generally designated by reference numeral 24 of the wheel and is displaced so far into the inside 15a of the dish-shaped or cup-shaped part 14a of the wheel carrier 14 that it is located at the same time at least partially also in the trough- or dish-shaped recess 15 of the brake disk 12 and is moved as close as possible to the vertical longitudinal center plane M of the wheel.

A rod or plate-shaped part 20 is inserted into the upper extension 17 and is welded together with the cup-shaped part 14a of the wheel carrier 14. At its upper end 21 of this part 20, cranked over the wheel 10, a further joint bolt 22 with ball pin 23 is detachably inserted whereby the two ball pins 19 and 23 determine the steering axis or steering knuckle pivot axis z.

The wheel carrier 14 is guided by the lower guide structure generally designated by reference numeral 24 and by an upper guide structure generally designated by reference numeral 25 at the vehicle superstructure 26 of any conventional construction and is spring supported with respect to the vehicle superstructure 26 by a coil spring 27 whereby the spring 27 is supported with its lower end by means of a joint piece 28 at the lower guide member 24 and with its upper end against a spring abutment 29 rigidly connected, for example, with the vehicle superstructure 26. A shock absorber 30 is arranged, for example, on the inside of the coil spring 27. Of course, for the purpose of spring supporting the wheel, in lieu of a coil spring, also any other suitable spring, especially an oil-air spring leg may be provided whereby, for example, the latter can assume in principle the same position as the coil spring 27. A stabilizer 31 in the form of a torsion rod is connected at the lower guide member 24 by means of a shackle or strap 31a, which stabilizer connects with each other in a customary manner the two wheel carriers of the oppositely disposed front wheels and is rotatably supported at the vehicle superstructure 26 in the bearings 32.

The lower guide structure 24 (FIG. 3) essentially consists of a cross guide member 33 arranged transversely to the driving direction $f$ for example of U-shaped cross section, and of thrust guide member 34 rigidly connected with the cross guide member 33 and extending principally in the longitudinal direction or at least at an inclination, which thrust guide member 34 extends in the longitudinal direction of the vehicle primarily for the absorption of thrust forces between wheel and vehicle superstructure. The cross guide member 33 which serves simultaneously also for the support of the spring 27, is supported by interposition of a rubber sleeve 36 on a sleeve-shaped joint pin 35 which is arranged, for example, by means of a U-shaped bearing bracket 35a or the like at the vehicle superstructure 26. The rubber sleeve 36 has thereby such a yieldingness that in addition to a yieldingness of the lower guide member about an approximately horizontal axis $x-x$, it permits above all a rotation of the guide member 33 about a vertical axis extending through the bearing point O.

The other guide member 34 is clamped or secured at the vehicle superstructure 26 at its pinlike end 37 by means of annularly shaped rubber blocks 38 of large volume whereby the rubber blocks 38 are so constructed that they permit a yieldingness of the longitudinal guide member 34 principally in the longitudinal direction $k$ thereof. The entire guide member system 24 consisting of the two guide members 33 and 34 can pivot as a result thereof, on the one hand, about the essentially horizontally disposed axis $x-x$ in relation to the vehicle superstructure 26 whereby the axis $x-x$ extends forwardly outwardly, and, on the other, can rotate about a vertical axis extending through the bearing point O of the joint pin member 35 so that the lower joint 19 of the wheel carrier 14 is able to carry out a limited elastic movement in the direction of arrows $f_1$, $f_2$, i.e., essentially in the driving direction $f$ or in a direction opposite thereto.

Figure 4:
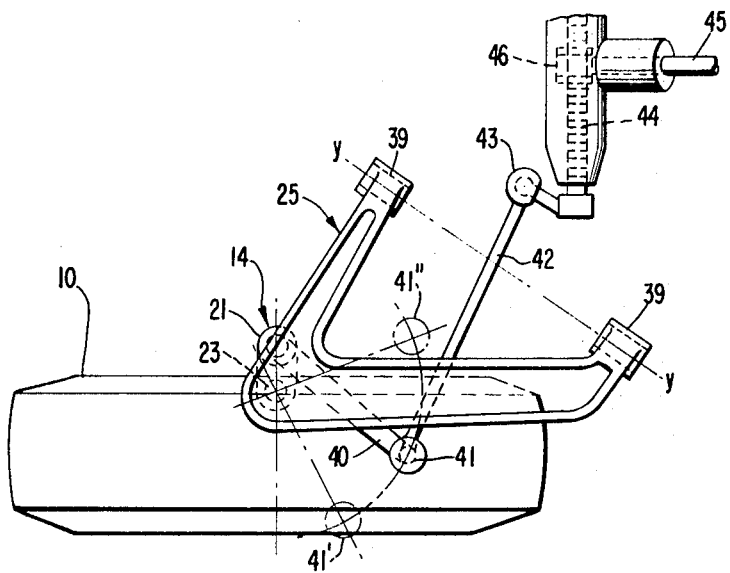
FIG. 4 is a plan view on the wheel suspension together with the upper guide member while omitting the lower guide member for sake of clarity.

The upper guide member generally designated by reference numeral 25, (FIG. 4) is also constructed triangularly or fork shaped and is supported at the vehicle superstructure 26 by means of two bearing eyes 39 either rigidly or under interposition of relatively thin-walled rubber bushes in such a manner that the guide member 25 is able to pivot about an essentially horizontal axis $y-y$ extending rearwardly outwardly but is practically nonyielding as to the rest.

Furthermore, a steering lever 40 is rigidly connected with the upper end 21 of the wheel carrier part 20 to which is connected by means of a ball joint 41 a steering rod 42. The steering rod 42, in its turn, is pivotally connected by means of ball joint 43 with a toothed rack 44 whose pinion 46 is adjustable by the steering column either directly or indirectly, for example, by means of a shaft 45, transversely to the driving direction $f$. By actuation of the toothed rack 44, the front wheel 10 is pivoted by means of the steering rod 42 and the steering lever 40 about the steering axis or steering knuckle pivot axis z whereby the joint 41 may assume, for example, the end position 41' or 41''.

By reason of the displacement of the joint 19 connecting the wheel carrier 14 with the lower guide member 24 into the trough-shaped recess 15 up to within proximity of the wheel center or the longitudinal center plane M of the wheel, it is possible to achieve a negative roll radius $r$ with a relatively small steering axis angle $\alpha$ in that the steering axis z intersects the road surface in a point R outside of the wheel contact point A with the road surface, which improves above all the straight drive of the wheel with strong differences of frictional coefficients between the two front wheel brakes.

If the wheel is hit by an impact extending opposite the driving direction $f$, the wheel carrier 14 together with the wheel 10 can deflect about the upper ball joint 23 because, as already explained, the lower longitudinal guide member 34 can yield in the direction of arrow $k$ by reason of its yielding bearing support in the rubber blocks 38 and as a result thereof, the joint 19 can deflect about the point O in the direction of arrow $f_1$. This deflection movement of the wheel opposite the driving direction $f$, however, practically does not influence the steering because the steering linkage 40, 42 is connected in proximity to the upper, nonyielding or nearly nonyielding ball joint 23 at the wheel carrier 14 or at the upper end 21 of the wheel carrier part 20.

Figure 3:
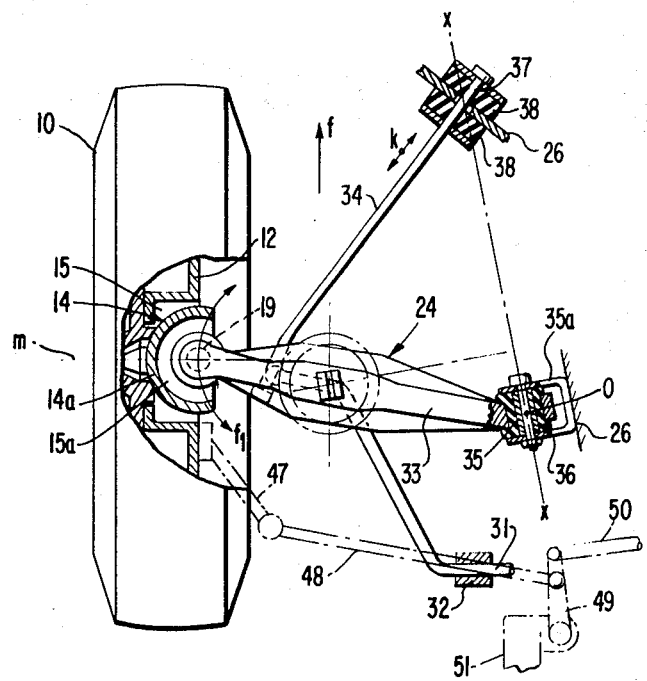
FIG. 3 is a top plan view on the wheel suspension of FIG. 1 and 2 together with the lower guide member while the upper guide member has been omitted for sake of clarity.

Possibly, the steering instead of being connected with the wheel carrier within the area of the upper joint 23, can also be connected therewith, within the area of the lower joint 19 as is indicated, for example, in dash and dot lines in FIG. 3, by means of the steering lever 47, the steering rod 48, the steering lever 49 with tie rod 50 and steering gear 51. The steering rod 48 is thereby disposed parallel to the guide member 33 and forms with the same at least nearly a joint parallelogram in order that the steering movement of the wheel is not influenced by the yieldingness of the lower guide member in the direction of arrows, $f_1$, $f_2$.

While we have shown and described only one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are within the scope of those skilled in the art.

We claim:

1. A suspension for the steerable front wheels of motor vehicles by means of superposed guide means pivotally connected with a wheel carrier means rotatably supporting a wheel hub structure having brake disk means, characterized by first joint means operatively connecting the lower guide means with the wheel carrier means, said joint means being arranged inside of an approximately dish-shaped recess provided in the brake disk means within the confines of the wheel hub structure at the height of the wheel center, and second joint means operatively connecting the upper guide means with the wheel carrier means, the steering axis determined by the straight line passing through the first and second joint means intersecting the road surface outside of the wheel contact point with the road surface with a negative roll radius, wherein the joint means operatively connecting the wheel carrier means with the upper guide means includes a joint connection located above the wheel and a connecting part connected to the wheel carrier means at one end and being cranked about the wheel contour correspondingly to connect at the other end to said joint connection.

2. A suspension for the steerable front wheels of motor vehicles by means of superposed guide means pivotally connected with a wheel carrier means rotatably supporting a wheel hub structure, characterized by joint means operatively connecting the lower guide means with the wheel carrier means, said joint means being at least partially arranged inside of an approximately dishcshaped recess in the wheel hub structure approximately at the height of the wheel center, wherein the upper guide means is pivotally supported about a pivot axis extending rearwardly outwardly and the lower guide means is pivotally supported about a pivot axis extending forwardly outwardly.

3. A suspension for the steerable front wheels of motor vehicles by means of superposed guide means pivotally connected with a wheel carrier means rotatably supporting a wheel hub structure, characterized by joint means operatively connecting the lower guide means with the wheel carrier means, said joint means being at least partially arranged inside of an approximately dish-shaped recess in the wheel hub structure approximately at the height of the wheel center, further comprising joint means operatively connecting the upper guide means with the wheel carrier means, the steering axis determined by the two joint means intersecting the road surface outside of the wheel contact point with the road surface with a negative roll radius, wherein the joint means operatively connecting the wheel carrier means with the upper guide means is supported at the vehicle superstructure relatively inelastically in the driving direction and the joint means operatively connecting the wheel carrier means with the lower guide means is supported at the vehicle superstructure relatively elastically in the driving direction by means of the respective guide means.

4. A suspension according to claim 3, wherein the elastically supported guide means is constructed forklike and includes a guide member extending approximately transversely to the driving direction and elastically supported at the vehicle superstructure in such a manner that it can rotate about an essentially vertical axis and a guide member extending substantially in the vehicle longitudinal direction and elastically supported at the vehicle superstructure by way of elastic block means in such a manner as to be able to yield essentially in the longitudinal direction so that the joint means operatively connecting the lower guide means with the wheel carrier means is able to yield essentially in the driving direction.

5. A suspension for the steerable front wheels of motor vehicles by means of superposed guide means pivotally connected with a wheel carrier means rotatably supporting a wheel hub structure, characterized by joint means operatively connecting the upper guide means with the wheel carrier means and supported at the vehicle superstructure relatively inelastically in the driving direction, joint means operatively connecting the lower guide means with the wheel carrier means and supported at the vehicle superstructure relatively elastically in the driving direction, and steering linkage means operatively connected with the wheel carrier means within the area of the upper, relatively inelastically supported joint means.

6. A suspension according to claim 5, wherein the joint means operatively connecting the wheel carrier means with the lower guide means being at least partially arranged inside of an approximately dish-shaped recess in the wheel hub structure approximately at the height of the wheel center, and the joint means operatively connecting the wheel carrier means with the upper guide means is located above the wheel and the wheel carrier means is cranked about the wheel contour correspondingly.

7. A suspension for the steerable front wheels of motor vehicles by means of superposed guide means pivotally connected with a wheel carrier means rotatably supporting a wheel hub structure, characterized by joint means operatively connecting the lower guide means with the wheel carrier means, said joint means being at least partially arranged inside of an approximately dish-shaped recess in the wheel hub structure approximately at the height of the wheel center, wherein the joint means operatively connecting the wheel carrier means with the upper guide means is supported at the vehicle superstructure relatively inelastically in the driving direction and the joint means operatively connecting the wheel carrier means with the lower guide means is supported at the vehicle superstructure relatively elastically in the driving direction by means of the respective guide means.

8. A suspension according to claim 7, wherein the elastically supported guide means is constructed forklike and includes a guide member extending approximately transversely to the driving direction and elastically supported at the vehicle superstructure in such a manner that it can rotate about an essentially vertical axis and a guide member extending substantially in the vehicle longitudinal direction and elastically supported at the vehicle superstructure by way of elastic block means in such a manner as to be able to yield essentially in the longitudinal direction so that the joint means operatively connecting the lower guide means with the wheel carrier means is able to yield essentially in the driving direction.

9. A suspension according to claim 7, further comprising steering linkage means operatively connected with the wheel carrier means within the area of the upper, essentially nonelastically supported joint means.

10. A suspension according to claim 9, wherein the upper guide means is pivotally supported about a pivot axis extending rearwardly outwardly and the lower guide means is pivotally supported about a pivot axis extending forwardly outwardly.

11. A suspension for the steerable front wheels of motor vehicles by means of superposed guide means pivotally connected with a wheel carrier means rotatably supporting a wheel hub structure characterized by joint means operatively connected the lower guide means with the wheel carrier means, said joint means being at least partially arranged inside of an approximately dish-shaped recess in the wheel hub structure approximately at the height of the wheel center, the joint means operatively connecting the wheel carrier means with the upper guide means being being located above the wheel and the wheel carrier means being cranked about the wheel contour correspondingly, the joint means operatively connecting the wheel carrier means with the upper guide means being additionally supported at the vehicle superstructure relatively inelastically in the driving direction and the joint means operatively connecting the wheel carrier means with the lower guide means being supported at the vehicle superstructure relatively elastically in the driving direction by means of the respective guide means.

12. A suspension according to claim 11, wherein the joint means operatively connecting the lower guide means with the wheel carrier means is accommodated at the same time on the inside of a cup-shaped part of the wheel carrier means extending into said recess.

13. A suspension according to claim 11, wherein the elastically supported guide means is constructed forklike and includes a guide member extending approximately transversely to the driving direction and elastically supported at the vehicle superstructure in such a manner that it can rotate about an essentially vertical axis and a guide member extending substantially in the vehicle longitudinal direction and elastically supported at the vehicle superstructure by way of elastic block means in such a manner as to be able to yield essentially in the longitudinal direction so that the joint means operatively connecting the lower guide means with the wheel carrier means is able to yield essentially in the driving direction.

14. A suspension according to claim 13, wherein the upper guide means is pivotally supported about a pivot axis extending rearwardly outwardly and the lower guide means is pivotally supported about a pivot axis extending forwardly outwardly.

15. A suspension according to claim 14, further comprising steering linkage means operatively connected with the wheel carrier means within the area of the upper, essentially nonelastically supported joint means.

* * * * *